Patented Sept. 16, 1947

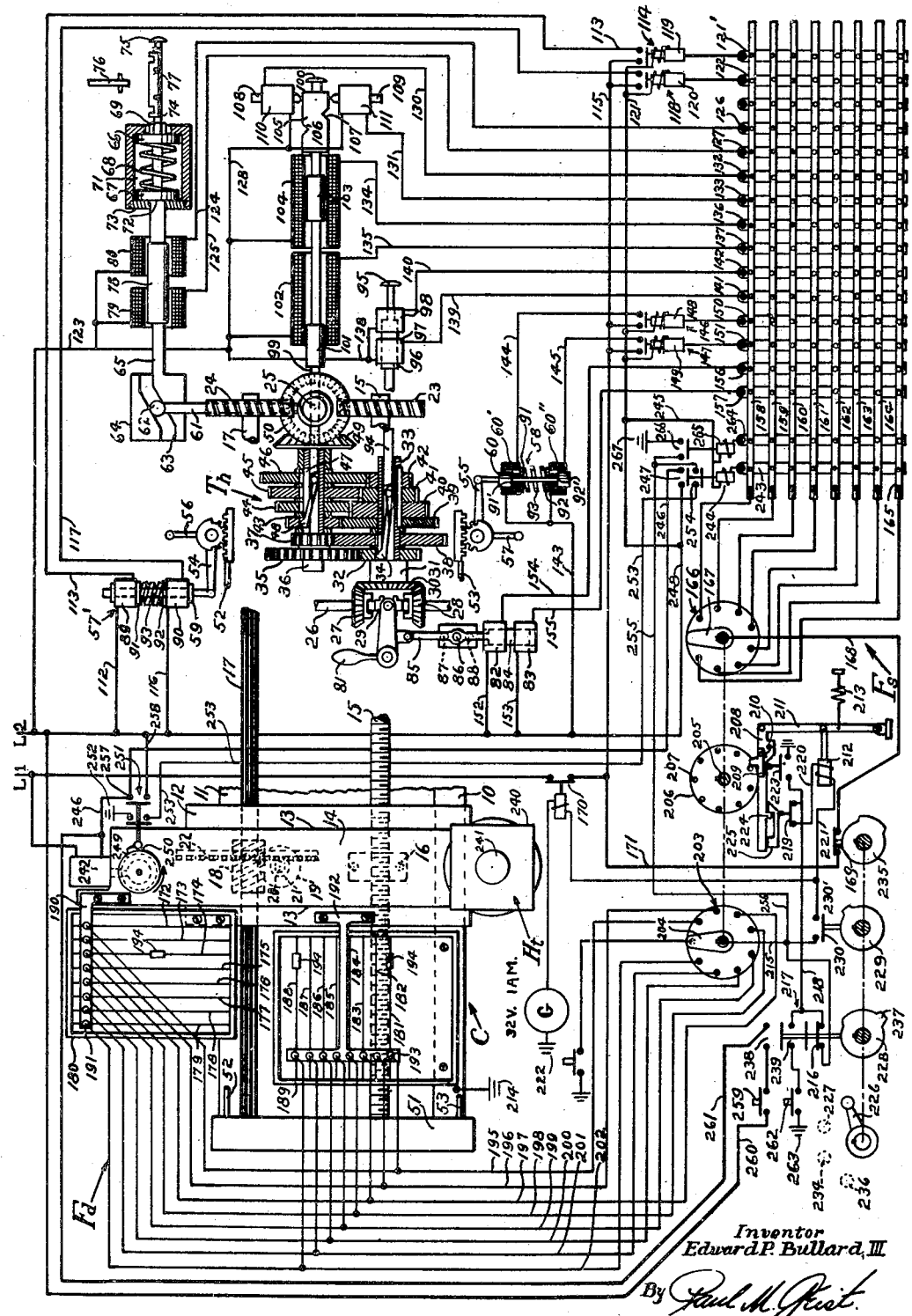

2,427,493

UNITED STATES PATENT OFFICE 2,427,493

CONTROL MECHANISM

Edward P. Bullard, III, Fairfield, Conn., assignor to The Bullard Company, a corporation of Connecticut Application June 26, 1944, Serial No. 542,130

16 Claims. (Cl. 192—142)

This invention relates to controls for apparatus capable of producing a relatively large number of functions. Particularly, it relates to a control mechanism that will automatically select, in any order within a cycle of operation, any one or more functions of which an apparatus is capable, while providing separate means for very accurately determining the extent of each of said functions.

This invention contains subject matter similar to application Serial No. 541,986 filed June 24, 1944, in the name of Edward P. Bullard III.

Objects of the invention include, the provision of a control mechanism for cycle-operating apparatus of the type that involves means adapted repeatedly to be moved along one or more paths in any order and for any distance; the provision of a control mechanism for a machine including means capable of performing a multiplicity of functions, wherein the control is adapted to render said means fully automatic, but still preserve its manual operativeness; and the provision of a control mechanism for a machine of the type that involves means adapted repeatedly to be moved along one or more paths for different overlapping distances within a cycle of operation.

Other objects of the invention include, the provision of an apparatus capable of performing a plurality of functions and stationary means adapted to be pre-set for successively causing the apparatus to produce a series of any of the functions of which it is capable; the provision of such an apparatus that is electro-magnetically operated; and the provision of an entirely electrically controlled and operated apparatus capable of performing a relatively great number of functions within a cycle of operation and wherein a stationary control panel for the apparatus can be pre-set to cause said apparatus to produce any of said functions in any order within a cycle of operation.

The above, as well as other objects and novel features of the invention, will become apparent from the following specification and accompanying drawing, in which the single figure discloses a schematic representation of apparatus embodying the principles of the invention.

Referring to the drawing, the principles of the invention are shown as applied to the type of apparatus disclosed in application Serial No. 541,986 above referred to including a turret $H_t$ that is movable along intersecting paths on a supporting member C by the operation of a change speed feed-works transmission $T_h$. The transmission $T_h$ is adapted selectively to be operated to cause the head $H_t$ to move at any one of a plurality of speeds in either direction along the paths of motion of the head $H_t$.

Function-selecting mechanism $F_s$ is adapted to be pre-set to cause the transmission $T_h$ successively to move the head $H_t$ along the desired paths and at the desired speeds to perform a plurality of functions within a cycle of operation. Function-determining mechanism $F_d$ is provided which includes separate means for each function set up on the mechanism $F_s$ for stopping the motion of the head $H_t$ when it has completed said function. The mechanism $F_d$ also initiates the next succeeding operation of the head $H_t$ in the cycle of operation.

The support C is the cross-rail disclosed in the application above identified and comprises bearings 10 and 11 along which a saddle 12 is adapted to be moved. The saddle 12 is provided with bearings 13 at substantially right angles to the bearings 10 and 11 for a slide 14. A screw 15 is threaded into a boss 16 fixed to the back of the saddle 12. Rotation of the screw 15, therefore, effects movement of the saddle 12 along the bearings 10 and 11 of the carrier C.

A splined shaft 17 extends through a worm 18 mounted on the back of the saddle 12 such that rotation of the shaft 17 causes rotation of the worm 18 regardless of the position of the saddle 12 along the bearings 10 and 11 on the carrier C. The worm 18 meshes with a worm gear 19 freely journaled on a pin 20 on the saddle 12. A spur gear 21 is fixed to the worm gear 19 and meshes with a rack 22 fixed to the slide 14. Accordingly, rotation of shaft 17 will effect movement of the slide 14 along the bearings 13 of the saddle 12. Rotation of the screw 15 and the splined shaft 17 in either direction and at a plurality of speeds is caused by the operation of the change speed transmission $T_h$. The outer end of the screw 15 supports a worm gear 23, and a similar worm gear 24 is fixed to the outer end of the splined shaft 17. Hand cranks may be attached to the outer end of shafts 15 and 17 in the manner shown in the application Serial No. 541,986 above referred to for manually turning the screw 15 and the shaft 17 for the purpose of manually moving the turret head $H_t$. A worm 25 is located between the two gears 23 and 24. It is adapted to be rotated in either direction at any one of a plurality of speeds by the feed-works transmission $T_h$. Accordingly, it is only necessary to move the worm 25 upwardly into engagement with the gear 24 in order to provide movement of the slide 14 along the bearings 13; and to lower worm 25 downwardly into engagement with the gear 23 to provide movement of the saddle 12 along the cross rail C.

The feed-works transmission Th includes a shaft 26 that is driven by the head-stock transmission (not shown). This head-stock transmission is the same as the headstock Tw in the above-referred-to application. Its function is to rotate the work support and to impart power to the feed-works transmission Th. The shaft 26 supports two bevel gears 27 and 28 for free rotation. A clutch 29 is located between the gears 27 and 28 and it is splined to shaft 26. Both gears 27 and 28 mesh with a bevel gear 30. The bevel gear 30 includes a sleeve portion 31 to which is fixed a spur gear 32 forming a compound gear unit journaled on a shaft 33. The shaft 33 is tubular in construction for the reception of a diving-key 34. The gear 32 meshes with one gear 35 of a gear cluster that is journaled on a shaft 36. The other gear 37 of said gear cluster meshes with a gear 38 that is journaled on the tubular shaft 33. There is a slot in the tubular shaft 33 within the gears 32 and 38 through which the head of the diving key 34 is adapted to extend. A gear cluster including gears 39, 40, 41, and 42 of different diameters is keyed to the tubular shaft 33 and these gears mesh respectively with gears 43, 44, 45 and 46 freely journaled in spaced relation on a tubular portion of shaft 36. A slot 47 in shaft 36 extends within the gears 43, 44, 45, and 46 through which the head of the diving key 48 is adapted to extend. The end of shaft 36 opposite that which supports the gear cluster 35, 37, is provided with a bevel gear 49 that meshes with a bevel gear 50 fixed to the worm 25. From the foregoing it is evident that the worm 25 can be rotated in either direction at any one of eight different speeds depending upon the position of the diving keys 34, 48, and clutch 29. For example, with the key 34 in the position shown in the drawing, rotation of the gear 30 is transmitted directly to the tubular shaft 33 through gear 32, thence to the gears 39 and 43, which latter is keyed to shaft 36 by the diving key 48. This rotation is then transmitted to the bevel gear 49, the bevel gear 50, and the worm 25. When the key 34 is moved so that gear 38 is keyed to shaft 33, the rotation of the gear 32 is transmitted to the gear 35, thence to the gear 37 fixed to gear 35, thence to the gear 38, shaft 33, gear 39, gear 43, shaft 36, and the worm 25 as previously described. Accordingly, the diving key 48 may be moved to four different positions, at each of which the two rates of rotation supplied by shifting key 34 can be employed. Therefore, eight separate speeds can be provided by the transmission Th.

A housing 51 is attached to the end of the cross-rail C opposite that which supports the feed-works Th. It is adapted to house continuously driven, oppositely-rotatable means that is adapted to be connected to, and disengaged from the screw 15 and the splined shaft 17 by the selective operation of rods 52 and 53. These rods are axially movable by the oscillation of the crank arms 54 and 55. This construction provides means for moving the turret head Ht along either of its paths at a relatively fast traverse speed.

The crank arms 54 and 55 are adapted to be operated by hand levers 56 and 57. These crank arms are also adapted automatically to be operated by identical electro-magnet mechanisms 57' and 58. The mechanism 57' includes a core element 59 that is connected to the crank arm 54. A similar core element 60 of the mechanism 58 is connected to the crank arm 55. Electromagnet coils 89 and 90 surround the core 59 and are fixed in spaced relation; and similar coils 60', 60'' surround the core 60 of the mechanism 58. A spring 93 is located between two discs 91 and 92 for each mechanism 57' and 58, each of which abuts one of the coils of its mechanism. The discs 91 and 92 of each mechanism permit free movement of its core relatively thereto. Collars 91', 92' are provided between the discs 91 and 92 and the respective effective portions of cores 60 within coils 60', 60''. Accordingly, energization of either of the coils 60', or 60'' causes its respective effective portion to approach the center of its coil, thereby moving the crank arm 55 to cause head Ht to move at traverse speed. Upon de-energization of both coils 60' and 60'', spring 93 moves core 60 so that the centers of its effective portions within coils 60', 60'' are spaced an equal distance in opposite directions from the centers of said coils thereby neutralizing the crank arm 55 and stopping the traverse movement of head Ht.

The worm 25 is provided with a connecting rod 61 having a roll 62 at its upper extremity that is adapted to ride in a cam groove 63 within a reciprocable member 64. A rod 65 extends from one side of the reciprocable member 64 and supports spaced discs 66 and 67. A spring 68 is located between the discs 66 and 67 and the assembly is held on the rod 65 by a nut 69. The assembly is located within a cylinder 71. Disc 66 rests against one end of cylinder 71 and nut 69 is adapted to pass through an opening in its center. Disc 67 rests against a plug 73 closing the cylinder 71, and also against a shoulder 72 formed on shaft 65. The spring 68 is initially pre-loaded before assembly so that it remains under compression always. The construction and arrangement of the parts are such that movement of the member 64 in either direction will cause the roller 62 to be moved so that the worm 25 will mesh with one or the other of the gears 23 or 24. Upon release of the force holding the member 64 in either of its positions, spring 68 will immediately return it to its central position thereby locating the worm 25 between the gears 23 and 24. A rod 74 extends outwardly from rod 65, and it is provided with a handle 75 for manual shifting the cam block 64. A pivotally mounted latch 76 is adapted to cooperate with a lug 77 on the shaft 74 for holding the member 64 in either of its axially-adjusted positions against the neutralizing effect of the spring 68. A portion of the rod 65 comprises a core member 78 that extends through the center of two electro-magnets 79 and 80 which upon energization effect the reciprocable movement of the member 64 to cause the worm 25 to be meshed with either of the gears 23 or 24. Upon the deenergization of the solenoids 79 and 80, the spring 68 will cause centralization of the member 64 thereby moving the worm 25 midway between the gears 23 and 24.

The clutch 29 is adapted manually to be operated by a hand lever 81. The clutch 29 is adapted automatically to be operated by two solenoids 82 and 83. A core 84 for the solenoids 82 and 83 is connected by a rod 85 to the shifting lever of clutch 29. A spring pressed detent 86 is adapted to engage recesses 87 and 88 on either side of a neutral position to locate the clutch 29 in either of its active positions. Energization of either of the solenoids 82 or 83 will cause the clutch 29 to be engaged with either of the bevel gears 27 or 28. The neutral position for clutch 29 has no significance and is not necessary since it will do no harm to retain clutch 29 in engagement with either of gears 27 or 28 due to the nature of the operation of the drop worm 25. With worm 25 in its central position, the position of clutch 29 is immaterial because the feed-works drives nothing.

The diving key 34 is adapted to be moved to only two positions, namely, that in engagement with the gear 32 and that in engagement with the gear 38. The key 34 is provided with an actuating shaft 94 to the outer end of which is fixed handle 95 for manually shifting said key. Part of the shaft 94 forms a core 96 that extends through two coils 97 and 98 of a solenoid mechanism. The construction and arrangement of parts are such that energization of the solenoid 98 will move the key 34 to engagement with the gear 38; and energization of the coil 97 will move the key 34 to engagement with the gear 32.

The key 48 is provided with a shaft 99 to the outer extremity of which is connected a handle 100 for manually shifting the key 48 to its four effective positions, namely, to engage gears 43, 44, 45, or 46. A portion of the shaft 99 is formed as a core 101 that is controlled by a solenoid coil 102. Another portion of the shaft 99 is formed as a core 103 effective within a coil 104 of another solenoid. Near the handle 100, the shaft is provided with a member 105 including spaced notches 106 and 107. Solenoid-operated locking plungers 108 and 109 are provided, respectively, to cooperate with the notches 106 and 107 upon energization of their respective coils 110 and 111. The construction and arrangement of the parts are such that energization of the coils 102 and 111, simultaneously, will cause the key 48 to move from engagement with the gear 43 to engagement with the gear 44. Simultaneous energization of the coils 102 and 110 will cause the movement of the key 48 from engagement with the gear 43 to engagement with the gear 45. Energization of the coil 102 alone, will cause the core 101 to move centrally thereof and effect movement of the key 48 to engagement with the gear 46. With the key 48 in engagement with the gear 46, a portion of the core 103 will extend beyond the right hand side of the coil 104. Accordingly, simultaneous energization of the coil 104 with the energization of coil 110 will effect movement of the key 48 from engagement with the gear 46 to engagement with the gear 45. Simultaneous energization of coil 104 and the coil 111 will effect movement of the key 48 from engagement with the gear 46 to engagement with the gear 44. Finally, energization of the coil 104 alone will cause movement of the key 48 from engagement with the gear 46 to engagement with the gear 43.

The one terminal of the coil 89 is connected by a conductor 112 to a main source of current $L_2$, the opposite terminal of the coil 89 is connected by a conductor 113 to one pole of a time-delay relay 114. The opposite pole of the relay 114 is connected to a conductor 115 that is connected to the main line $L_1$. One end of the coil 90 is connected by a conductor 116 to the line $L_2$, and the other end of the coil 90 is connected by a conductor 117 to the one pole of a similar time-delay relay 118. The opposite pole of relay 118 is connected to line 115. Each of the time-delay relays 114 and 118 is provided with a solenoid coil 119 and 120, respectively. The one end of each of the coils 119 and 120 is connected to a line 121 that is in turn connected to the main line $L_2$. The opposite end of each of the coils 119 and 120 is connected to vertically-arranged bus bars 121', and 122 respectively. One end of each of the coils 79 and 80 is connected through a conductor 123 to the line $L_2$. The other end of each of the coils 79 and 80 is connected through conductors 124 and 125 to vertically-arranged bus bars 126 and 127, respectively. One end of each of the coils 110 and 111 is connected through a conductor 128 to conductor 123 leading to the line $L_2$. The opposite end of each of the coils 110 and 111 is connected through conductors 130 and 131 to vertically-arranged bus bars 132 and 133, respectively. One end of each of the coils 104 and 102 is connected through the conductor 128 and the conductor 123 to the line $L_2$. The opposite end of each of the coils 104 and 102 is connected through conductors 134 and 135, respectively, to vertically-arranged bus bars 136 and 137. One end of each of the coils 97 and 98 is connected through a conductor 138 to the conductor 128 which in turn is connected through the conductor 123 to the line $L_2$. The opposite end of each of the coils 97 and 98 is connected through conductors 139 and 140 to vertically-arranged bus bars 141 and 142, respectively.

One end of each of the coils 60' and 60" is connected through a conductor 143 to the line $L_2$. The opposite end of each of the coils 60' and 60" is connected through conductors 144 and 145 to the one pole of each of two time-delay relays 146 and 147, identical with time-delay relays 114 and 118. The opposite pole of the time-delay relays 146 and 147 is connected to the conductor 115 which in turn is connected to the main line $L_1$. The one end of solenoid coils 148 and 149 of the time delay-relays 146 and 147 is connected to the conductor 121 which in turn is connected to the line $L_2$. The opposite end of each of the coils 148 and 149 is connected to vertically-arranged bus bars 150 and 151, respectively. One end of each of the coils 82 and 83 is connected to the line $L_2$ through conductors 152 and 153. The opposite end of each of the coils 82 and 83 is connected through conductors 154 and 155 to vertically-arranged bus bars 156–157, respectively. The bus bars 121', 122, 126, 127, 132, 133, 136, 137, 142, 141, 150, 151, 156, 157 are fixed to a supporting member such that all of said vertically-disposed bus bars are arranged in the same plane. A plurality of horizontally-disposed bus bars 158 to 165 inclusive is arranged on the supporting member in spaced insulated relation relatively to the vertically-disposed bus bars. Apertures are provided at the point of intersection of each vertical and horizontal bus bar. The construction and arrangement of the parts are such that the combination of the horizontal and vertical bus bars provides in effect a switch board adapted to receive plugs which when inserted in the apertures form an electrical connection between the horizontal and vertical bus bars. There are as many horizontally-disposed bus bars as there are functions required in a cycle of operation to produce a given amount of work. In the schematic disclosure only eight horizontally-disposed bus bars are shown. Practically forty such horizontally-disposed bus bars have been found to be adequate to satisfy the demands within an ordinary cycle of operation. There may of course, be more than forty such bus bars if necessary.

Each of the bus bars 158 to 165 inclusive is connected through a conductor to separate contacts about a distributor 166. The distributor includes an arm 167 that is adapted to be indexed from contact to contact about the distributor. The arm 167 is connected by a conductor 168 through two switches 169 and 170, to be described later, thence to the line L1. Accordingly, as the arm 167 is indexed from contact to contact, it successively energizes the bus bars 158 to 165, respectively. Energization of the bus bar 158 will cause the transmission Th to produce any of its functions provided a plug is located in the correct aperture at the intersection of the horizontal bus bar 158 and the desired vertically-disposed bus bar. Accordingly, each of the horizontally-disposed bus bars represents a portion that is adapted selectively to be pre-set with plugs to cause the head Ht to perform any movement of which it is capable.

That which has been described comprises selectively operable mechanism for causing the turret head Ht to produce any motion of which it is capable in accordance with the energization of the various circuits controlling the operation of the feed-works Th. The extent of any function selected by a pre-set horizontally-disposed bus bar 158 to 165 is adapted to be determined by the mechanism Fd which is associated with, and responsive to the movements of the head Ht. This mechanism is designed to provide a separate function-determining means for each function called for by a setting of plugs along a horizontally-disposed bus bar. It comprises in the present embodiment, switch-trip supporting means 172 to 179 inclusive, one for each of the horizontally-disposed bus bars 158 to 165 inclusive. The switch-trip supporting means are mounted on a panel 180 rigidly attached to the saddle 12. Similarly, switch-trip supporting means 181 to 188, inclusive, are mounted on a panel 189 rigidly fixed to the cross rail C. An arm 190 is fixed to and movable with the slide 14 and includes a portion having switches 191 above the supporting means 172 to 179 inclusive. An arm 192 is fixed to, and movable with the saddle 12 along the cross-rail C, and it includes a portion having switches 193 above each of the supporting means 181 to 188 inclusive. The construction and arrangement of the parts are such that movement of slide 14 along the bearings 13 in the saddle 12 will cause the switches 191 to move along the supporting means 172 to 179 inclusive; and horizontal movement of saddle 12 along the bearings 10 and 11 of the cross-rail C will cause the switches 193 to move along the supporting means 181 to 188 inclusive.

Adjustably mounted dogs 194 are adapted to be located along each of the supporting means 172 to 179 and 181 to 188 (both inclusive). The switch 191 above the supporting means 172 is connected to the switch 193 above the supporting means 181 by a common conductor 195. The switch 191 above the supporting means 173 is connected to the switch 193 above the supporting means 182 by a common conductor 196. The switch 191 above the supporting means 174 is connected to the switch 193 above the supporting means 183 by a common conductor 197. The switch 191 above the supporting means 175 is connected to the switch 193 above the supporting means 184 by a common conductor 198. The switch 191 above the supporting means 176 is connected to the switch 193 above the supporting means 185 by a common conductor 199. The switch 191 above the supporting means 177 is connected to the switch 193 above the supporting means 186 by a common conductor 200. The switch 191 above the supporting means 178 is connected to the switch 193 above the supporting means 187 by a common conductor 201. Finally, switch 191 above the supporting means 179 is connected to the switch 193 above the supporting means 188 by a common conductor 202. Each of the common conductors 195 to 202 inclusive is connected to a separate contact about a distributor 203 including an arm 204.

The construction of the switches 191 and 193 is identical with the construction of the switches shown, and described, and claimed in application Serial Number 541,986 above-referred-to. Additionally, the supporting means 172 to 179 and 181 to 188 together with the adjustable dogs 194 are identical with the construction disclosed in the above-referred-to application to which case attention is directed for specific details of construction. Furthermore, the circuit including switches 191 and 193 is the same as that shown, described and claimed in said application. The switches 191 and 193 are in parallel relatively to each other but in series with a source of low voltage of less than about fifty volts; an operating device such as solenoid 212; one or more electrical contacts adapted to be operated relatively quickly and capable of relatively wide separation when open, such as the contacts of distributor 203 and arm 204 thereof; and one or more circuit-energizing contacts which are incorporated in the switches 191 and 193. Furthermore, the circuit energizing contacts of switches 191 and 193 are adapted to be closed at any desired rate to energize the circuit without causing arcing between them; and the quick-opening contacts of the distributor 204 are adapted to be opened before opening of the contacts that energized the circuit, all as more fully described in application Serial Number 541,986, filed June 24, 1944.

The arms 167 and 204 of the distributors 166 and 203 are fixed to a shaft 205 that additionally supports a disc 206 having pawl-engaging pins 207 located at equal intervals above the periphery of said disc. A reciprocable member 208 is located in position such that a pivotally-mounted pawl 209 thereon is adapted to cooperate with the pins 207 to index the disc 206 an amount sufficient to move the arms 167 and 204 to succeeding contacts about each of said distributors upon the movement of the member 208 in one direction. A spring 210 permits deflection of the pawl 209 on the reverse movement of the member 208 so that it may re-set for a succeeding indexing movement of the disc 206. The member 208 is pivoted to a link 211 to which latter a solenoid 212 is connected. Energization of solenoid 212 effects counterclockwise movement of the link 211. A spring 213 is connected to the link 211 for urging it in a clockwise direction. The construction and arrangement of the parts are such that energization of the solenoid 212 effects a single indexing movement of the arms 167 and 204; and upon de-energization of the solenoid 212, spring 213 returns the member 208 preparatory to a succeeding indexing movement of the arms 167 and 204.

It is believed advisable to describe the operation of the circuit including the solenoid 212 by explaining a limited operation of the apparatus with a specific setting of a plug in one of the horizontally-disposed bus bars 158 to 165. Assume therefore, that a plug is located at the intersection of the bus bar 158 and 150; the arm 167 is in engagement with the contact of distributor 166 that leads to bar 158; and the arm 204 of distributor 203 is in engagement with the contact of said distributor to which the conductor 195 is connected. Under these circumstances, current flows from the line L₁ through the switch 170, the conductor 171, the switch 169, the conductor 168, the arm 167, the conductor leading to the bus bar 158, the plug in bar 158, bar 150, the coil 148 of the time-delay relay 146, the conductor 121 to the line L₂. This circuit energizes the coil 148 thereby effecting closing of the relay 146 after a pre-determined time interval. Closing of the relay 146 permits current to flow from the line L₁ through the conductor 115, the closed contacts of the relay 146, the conductor 144, solenoid coil 60′, the conductor 143 to the line L₂ thereby energizing the solenoid 60′. Energization of the solenoid 60′ causes counter-clockwise movement of the crank 55 thereby initiating traverse movement of the head Ht by rotating the screw 15 at a relatively rapid speed and in a direction to cause the head Ht to move toward the right as viewed in the drawing. Since the function determined by the plug in the bus bar 158 is a horizontal movement of the head Ht, no dog 194 is present on the supporting means 172 for the vertical-movement determining means of Fd. Rightward horizontal movement of the head Ht continues until the switch 193 above the support 181 is closed by contact between said switch and the dog 194. On closing the switch 193, a circuit is established from a ground 214, through the frame of the machine including the cross rail C, thence through the closed switch 193, the conductor 195, the arm 204 of distributor 203, a conductor 215, normally-closed contacts 216 of a three-contact relay 217, thence through a conductor 218 to normally-closed switch 219, thence through a conductor 220, solenoid 212, and a conductor 221, thence through a coil of the solenoid relay 170 to the generator, thence to the ground 222. Energization of the solenoid 212 causes the leftward movement of the member 208 thereby indexing the arms 167 and 204 to the next succeeding contact of their respective distributors 166 and 203. Additionally, energization of relay 170 causes it to interrupt the flow of current to the switch board bus bar 158, thereby causing relay 146 to open to deenergize coil 60′ permitting the spring of the device 58 to instantly neutralize crank arm 55 and stop the movement of head Ht. As soon as the arm 204 leaves the contact establishing the circuit for the solenoid 212, the ground 214 is removed from the circuit, and if one is not substituted therefor, a complete indexing would not occur. Accordingly, a switch 223 that is normally open is adapted to be closed upon the initial leftward movement of the member 208. One pole of the switch 223 is grounded, and the other pole is connected to the one pole of the switch 219 such that the switch 223 acts as a holding switch for the circuit of the solenoid 212 to effect complete indexing of the arms 167 and 204. Near the end of the leftward movement of the member 208, a dog 224 fixed to the member 208 engages the one side of a relatively wide slot in a switch-actuating member 225. The member 225 normally holds the switch 219 closed, but near the end of the leftward movement of the member 208, cooperation between the dog 224 and the member 225 effects opening of the switch 219 thereby deenergizing the solenoid 212. Instantly, the spring 213 retracts the member 208 to the right preparatory to a succeeding indexing operation of the arms 167 and 204.

When the arm 167 reaches its next succeeding contact, it energizes the horizontal bus bar 159 thereby causing the transmission Th to move the head Ht as dictated by the plug setting in the strip 159. At the completion of this operation, the corresponding supporting means 172 to 179 or 181 to 188 with its dog 194 effects closing of the corresponding switch 191 or 193 to cause another indexing operation of the disc 206 and the distributor arms 167 and 204.

Certain variations in the operation of the apparatus just described are adapted to be effected upon the movement of a control handle 226 to four different positions. With the control handle 226 in the solid line position shown in the drawing, the apparatus operates in the manner previously described. Upon movement of the handle 226 to the position 227 a cam 228 opens the normally-closed contact 216 of the switch 217 but fails to close either of the other two sets of contacts of said switch. Additionally, a cam 229 closes a switch 230.

With the handle 226 in the position 227, the apparatus is conditioned such that upon the completion of the function being performed when the handle 226 is moved to the position 227, the turret head Ht will stop moving, and no succeeding function will begin. At the completion of such function the switch 191 or 193, whichever the case may be, is closed by the action between it and its corresponding dog 194. This will establish a circuit from ground 214 through the frame of the machine, the switch 191 or 193, the corresponding conductor 195 to 202, the distributor arm 204, the conductor 215, the switch 230, a conductor 230′, the coil of relay 170 to the generator G then to the ground 222. Energization of the coil of relay 170 opens it thereby de-energizing the board including the bus bars and, therefore, causing neutralization of all the operating parts of the feedworks Th. No current will flow through solenoid 212 and hence arms 167 and 204 will not be indexed but remain as they were, maintaining the circuit including the coil of relay 170 energized. Therefore, the apparatus will remain in an inactive state until handle 226 is moved from position 227. Upon movement of handle 226 from position 227 to its solid line position, the coil of relay 170 will remain energized through switch 216 when switch 230 opens. Instantly, however, coil 212 is energized through the closing of switch 216 and the distributor arms 167 and 204 are indexed to their next succeeding contacts, thereby causing the apparatus to begin the next succeeding function.

Movement of the handle 226 to the position 234 will cause a cam 235 to open the normally closed switch 169 thereby de-energizing the switchboard including the horizontal and vertical bus bars. Accordingly, all of the solenoid controls of the transmission Th will instantly be de-energized and the operating parts of the transmission will be instantly neutralized by the action of the springs of each of said solenoid controls. This will effect instant stopping of the movement of the head Ht.

Movement of the handle 226 to the position 236 will cause switch 169 to remain open thereby neutralizing all of the solenoid control mechanisms for the transmission Th. Additionally, a portion 237 on the cam 228 will cause closing of contacts 238 and 239 of the switch 217. With the handle 226 in the position 236, the transmission $T_h$ may be manually operated by actuating the hand levers 81, 56, 57, 75, 100 and 95. Other features of manual operation will be described later.

The turret $T_t$ comprises a member 240 mounted for rotation about a pin 241 at the lower end of the slide 14. The turret 240 is adapted to be indexed from station to station by the operation of a motor 242 mounted on the slide 14. The connection between the motor 242 and the turret 240 is the same as that shown and described in application Serial Number 443,992, filed May 21, 1942 in the name of E. P. Bullard III et al, Patent Number 2,384,809.

The motor 242 is adapted to be operated from the switch board including the horizontal and vertical bus bars. Accordingly, a vertically-arranged bus bar 243 is connected to the one end of the coil of a solenoid-operated relay 244, the opposite end of which coil is connected through a conductor 245 to the main line $L_2$. Accordingly, with a plug located at the intersection between the vertical bus bar 243 and any of the horizontal bus bars 158 to 165 current will flow through the solenoid operated relay 244 when the arm 167 is in engagement with the contact of distributor 166 that corresponds with the horizontal bar containing said plug. When this condition arises, current flows from the line $L_1$ through the motor 242, thence through a conductor 246 to the one pole of a contact 247 of the relay 244, thence through a conductor 248 to the line $L_2$, thereby starting rotation of the motor 242. A cam disc 249 is caused to make one complete revolution when the turret 240 has indexed from one station to the next. Disc 249 is employed to effect indexing of distributor arms 167 and 204 at the completion of a turret index. It includes a cam 250 which upon cooperation with a switch 251 establishes a circuit including a ground 252, a conductor 253, contacts 254 of the relay 244, conductor 255, conductor 256, normally closed contacts 216 of relay 217, conductor 218, normally closed switch 219, conductor 220, solenoid 212, conductor 221 and generator G to the ground 222. This circuit accordingly energizes the solenoid 212 causing indexing of the distributor arms 167 and 204. In order to prevent the cam 250 on the disc 249 from remaining beneath switch 251 holding it in closed position, an additional contact 257 is closed when cam 250 operates the switch 251. Contact 257 maintains a circuit including line $L_1$, motor 242, conductor 246, contact 257, a conductor 258 to line $L_2$, whereupon the motor 242 continues to rotate until the cam 250 passes from beneath the switch 251 whereupon switch 251 opens, stopping the operation of the motor in position for a succeeding indexing operation of the turret 240 to be initiated.

With the hand lever 226 in the position 236, the contacts 238 and 239 of the relay 217 are closed. The contact 238 is in a circuit including a push-button switch 259, a conductor 260 that leads to the line $L_2$. The other pole of the switch 238 is connected to a wire 261 which in turn is connected to the conductor 246 and the motor 242, which latter is connected to the line $L_1$. Accordingly, with the hand lever 226 in the position 236, closing of the push-button 259 will effect indexing of the turret 240 independently of the automatic means previously described.

One pole of the contact 239 of the switch 217 is connected to one side of a push-button switch 262, the opposite side of which latter is connected to a ground 263. The other pole of contact 239 is connected to the line 218. The construction and arrangement are such that with the hand lever 226 in the position 236, closing of the push button 262 will establish a circuit from the ground 263 to the switch 262, the contact 239, the line 218, switch 219, conductor 220, solenoid 212 conductor 221 to the generator G and the ground 222, whereupon the distributor arms 167 and 204 are indexed.

It often occurs that all of the horizontal bus bars are not required to perform the complete cycle of operation, in which case the distributor arms 167 and 204 must be returned to their initial vertical positions prior to causing the apparatus to produce a repetitive cycle of operation. Accordingly, a vertical bus bar 264 is provided that is connected to one end of a coil 265, the opposite end of which is connected to conductor 245 leading to line $L_2$. Insertion of a plug at the intersection of any horizontal bus bar and bar 264 causes closing of a switch 266, the one pole of which is grounded at 267 and the other pole of which is connected to line 255 leading to switch 216, thence through coil 212 to ground 222 causing indexing of arms 167 and 204. Therefore any extra horizontal bars not required for the desired cycle of operation contain plugs at their intersections with bar 264.

The method of setting the apparatus to produce a predeterminable series of work operations is substantially identical with the method described in application Serial Number 541,986, filed June 24, 1944, in the name of E. P. Bullard III. The only substantial difference resides in the insertion of plugs at the correct locations on the bus bars 158 to 165 inclusive, instead of attaching dogs to a rotatable function drum. It is believed unnecessary to specifically describe a setting of the apparatus to produce a specific work piece since a complete description is set forth in the above identified application to which reference is directed for such details.

Although the various features of the improved control mechanism have been shown and described in detail to fully disclose one embodiment of the invention, it will be evident that numerous changes may be made in such detail and certain features can be used without others, without departing from the principles of the invention.

What is claimed is:

1. In an apparatus for producing a plurality of functions, a control member comprising a stationary supporting means including a plurality of portions, each adapted selectively to be set for causing said apparatus to produce a function; means for successively rendering said portions effective; means adapted to respond to each of said functions at any time during said functions for rendering effective the means that renders the successive portions effective; said responsive means including a plurality of portions one for each of said control member portions; and means for maintaining all of said portions in exact phase relation at all times.

2. In an apparatus for producing a plurality of functions, control means comprising a stationary panel including a plurality of separate portions, each adapted selectively to be set for causing said apparatus to produce a function; means adapted successively to render effective said portions; means adapted to respond to each of said functions at any time during said functions including a plurality of portions, one for each of said control means portions, each adapted adjustably to be pre-set for initiating the activity of the means that renders said control-means portions effective; and means for maintaining all of said portions in exact phase relation at all times.

3. Apparatus comprising in combination, a member; means for moving said member along a path; a control for said member-moving means for causing said member to move a plurality of times along said path for different overlapping distances within a cycle of operation, said control including a stationary panel having a plurality of portions, each adapted adjustably to be pre-set to effect the movement of said member in either direction along said path; means including a plurality of portions, one for each of said control-means portions, each of which is adapted adjustably to be pre-set to terminate a movement of said member at any point along said path; and means for maintaining all of said portions in exact phase relation.

4. Apparatus comprising in combination, a member; means for moving said member in either direction along a plurality of paths at a plurality of speeds; stationary means including a panel having a plurality of portions each adapted adjustably to be pre-set for controlling said member-moving means for determining the path, direction, and rate of motion of said member; means for each path of movement of said member including separate adjustable portions one for each of said member-moving control-means portions, the means for each path being responsive to the movement of said member throughout the entire extent of said path for controlling the starting and stopping of each motion of said member; and means for successively rendering effective said member-moving control-means portions.

5. Apparatus comprising in combination, a member adapted to be moved in either direction along a plurality of paths at a plurality of speeds; means for moving said member along said paths; a common control member comprising a stationary panel including a plurality of portions each adapted selectively to be set for controlling said member-moving means; separate means for each path along which said member is adapted to be moved for controlling the starting, stopping and extent of motion of said member along said path, each of said separate means including a plurality of portions, one for each of said control-member portions; and means for maintaining all of said portions in exact phase relation at all times.

6. Variable-cycle apparatus comprising in combination, member adapted to be moved in either direction along a path at a plurality of speeds a plurality of times within a cycle of operation; means for moving said member along said path at said speeds; means adapted selectively to be operated for controlling the operation of said member-moving means; a stationary panel including a plurality of portions each adapted selectively to be set to operate a plurality of means including selected of said control means to determine the direction and rate of each movement of said member within said cycle of operation; means for successively rendering effective said portions; and separate means for controlling successive movements of said member along said path, and responsive to the movement of said member at any point along its path of travel for determining when the next succeeding portion is to be rendered effective.

7. Apparatus comprising in combination, a member adapted to be moved in either direction along a plurality of paths at a plurality of speeds; means for moving said member along said paths at said plurality of speeds; means common to said paths of movement including a stationary panel having a plurality of separate portions each adapted selectively to be set for causing said member to move along any of said paths in any direction at any of said plurality of speeds; means for successively rendering effective the succeeding portions of said stationary panel; separate means for each path along which said member is adapted to be moved for determining when the succeeding portions of said panel are to be rendered effective; said separate means including a plurality of portions one for each of said stationary-panel portions; and means for maintaining all of said portions in exact phase relation at all times.

8. In an apparatus adapted to produce a plurality of functions, a control member comprising a stationary element including a plurality of portions, each adapted selectively to be set to cause said apparatus to produce a function; a source of relatively low voltage; an operating means adapted to be energized by said source of voltage; contact means capable of relatively wide separation and adapted to be opened relatively quickly by the action of said operating means; and other contact means adapted to be closed in response to a function being performed by said apparatus to energize said circuit, the construction and arrangement of the parts being such that said other contact means is adapted to be opened only after the operation of the said operating means.

9. In an apparatus for producing a plurality of functions, a control member comprising a stationary supporting means including a plurality of portions, each adapted selectively to be set to cause said apparatus to produce a function; a source of direct current of less than about fifty volts; an operating means adapted to be energized by said source of direct current; contact means capable of relatively wide separation adapted to be opened relatively quickly by the action of said operating means; other contact means adapted to be closed to energize said circuit; and means for closing said other contact means at any desired rate in response to a function being performed by said apparatus, the construction and arrangement of the parts being such that said other contact means is adapted to be opened only after the operation of said operating means.

10. In an apparatus for producing a plurality of functions, a control member comprising a stationary supporting means including a plurality of portions, each adapted selectively to be set for causing said apparatus to produce a function; a series circuit including a source of relatively low voltage; operating means adapted to be energized by said source of voltage; a plurality of contact means capable of relatively wide separation and adapted successively to be connected into said series circuit and to be opened relatively quickly by the action of said operating means; a plurality of other contact means for energizing said circuit, at least one for each of the quick-opening contact means, adapted successively to be connected into said circuit simultaneously with its corresponding quick-opening contact means by the action of said operating means; and means for closing said other contact means at any desired rate for energizing said circuit in response to any of the functions of said apparatus, the construction and arrangement of the parts being such that the opening of said other contact means which was closed to energize said circuit occurs subsequently to the opening of its corresponding quick-opening contact means.

11. In an apparatus comprising in combination, a member; means for moving said member in either direction along a plurality of paths at a plurality of speeds; means for controlling the movement of said member including a panel having a plurality of portions each adapted adjustably to be pre-set for determining the path direction and rate of motion of said member; a series circuit including a source of relatively low voltage; an operating means adapted to be energized by said source of voltage; a plurality of contact means, one for each of said portions, each contact being capable of relatively wide separation and adapted successively to be connected into said series circuit and to be opened relatively quickly by the action of said operating means; a plurality of sets of contact means, one for each of said portions, each set including a plurality of contacts, one for each path along which said member is adapted to be moved, said plurality of contacts being arranged in parallel relation relatively to each other, each set of contact means being adapted successively to be connected into said series circuit simultaneously with its corresponding quick-opening contact means by the action of said operating means; and means for closing any of said parallel-arranged contact means at any desired rate for energizing said circuit in response to the movement of said member, the construction and arrangement of the parts being such that any parallel-arranged contact which was closed to energize the circuit is opened only after the opening of its corresponding quick-opening contact means.

12. Apparatus comprising in combination, a member; means for moving said member in either direction along a plurality of paths at a plurality of speeds; electrically-operated means for rendering said member-moving means effective, each of said electrically-operated means being connected to a separate bus bar; a plurality of other bus bars arranged in spaced overlapping relation relatively to the bus bars for the electrically-controlled means, each of said other bus bars being connected to separate contacts of a distributor; and means for energizing said electrically operated means through said distributor comprising a plurality of plugs adapted selectively to be placed in contact with selected of said overlapping bus bars, whereby said apparatus can be made to perform a cycle of operation by successively moving a contact arm of said distributor about said separate contacts.

13. Apparatus comprising in combination, a member; means for moving said member in either direction along a plurality of paths at a plurality of speeds; electro-magnetic means for rendering said member-moving means effective; each of said electro-magnetic means being connected to a separate bus bar; a plurality of other bus bars arranged in spaced overlapping relation relatively to the bus bars for the magnetic means, each of said other bus bars being connected to separate contacts of a distributor; and means for energizing said electro-magnetic means through said distributor comprising a plurality of plugs adapted selectively to make a contact between selected of said overlapping bus bars, whereby said apparatus can be made to perform a cycle of operation by successively moving a contact arm of said distributor about said separate contacts.

14. Apparatus comprising in combination, a member; means for moving said member in either direction along a plurality of paths at a plurality of speeds; electro-magnetic means for rendering said member-moving means effective; control means including a stationary panel having a plurality of spaced portions each adapted selectively to be set to effect energization of selected of said electro-magnetic means; means adapted to respond to the movement of said member at any point during said movement for rendering effective successive of said portions; said responsive means including a plurality of portions, one for each of said control-member portions; and means for maintaining all of said portions in exact phase relation at all times.

15. Apparatus comprising in combination, a member; means for moving said member in either direction along a plurality of paths at a plurality of speeds; electro-magnetic means for rendering said member-moving means effective; a control member including a stationary panel having a plurality of portions each adapted selectively to be set to operate selected of said electro-magnetic means; a series circuit including a source of relatively low voltage; operating means adapted to be energized by said source of voltage; a plurality of contact means capable of relatively wide separation and adapted successively to be connected into said series circuit and to be opened relatively quickly; a plurality of other contact means, one for each of said portions for energizing said circuit, adapted successively to be connected into said series circuit simultaneously with its corresponding quick-opening contact means; and means for closing said other contact means at any desired rate for energizing said circuit in response to the movement of said member, the construction and arrangement of the parts being such that the opening of the said other contact means which was closed to energize said circuit occurs subsequently to the opening of the corresponding quick-opening contact means.

16. Apparatus comprising in combination, a member; means for moving said member in either direction along a plurality of paths at a plurality of speeds; electro-magnetic means for rendering said member-moving means effective; control means comprising a stationary panel having a plurality of successive portions each adapted selectively to be set to cause any of said electro-magnetic means to become effective; a plurality of means, one for each of said portions, for controlling the extent of movement of said member along said paths; and means for maintaining each of said portions and its corresponding movement-determining means in exact phase relation at all times.

EDWARD P. BULLARD, III.

REFERENCES CITED

The following references are of record in the file of this patent:

UNITED STATES PATENTS

| Number | Name | Date |
|---|---|---|
| 2,352,183 | Bullard | June 27, 1944 |